United States Patent
Kim

(10) Patent No.: US 10,550,981 B2
(45) Date of Patent: Feb. 4, 2020

(54) QUICK CONNECTOR OF FUEL TRANSFER LINE

(71) Applicant: Hyundai Motor Company, Seoul (KR)

(72) Inventor: Kyun Yeop Kim, Busan (KR)

(73) Assignee: Hyundai Motor Company, Seoul (KR)

( * ) Notice: Subject to any disclaimer, the term of this patent is extended or adjusted under 35 U.S.C. 154(b) by 218 days.

(21) Appl. No.: 15/203,657

(22) Filed: Jul. 6, 2016

(65) Prior Publication Data

US 2017/0122471 A1    May 4, 2017

(30) Foreign Application Priority Data

Oct. 30, 2015  (KR) .......................... 10-2015-0151727

(51) Int. Cl.
*F16L 37/098*   (2006.01)
*F16L 37/084*   (2006.01)

(52) U.S. Cl.
CPC ....... *F16L 37/0985* (2013.01); *F16L 37/0847* (2013.01)

(58) Field of Classification Search
CPC ....... F16L 37/0985; F16L 37/38; F16L 37/40; F16L 37/42; F16L 37/0987; F02M 55/00; B60K 15/00; B60K 15/01; B60K 2015/03447
USPC .......................................... 285/93, 319, 921
See application file for complete search history.

(56) References Cited

U.S. PATENT DOCUMENTS 5,365,906 A * 11/1994 Deweerdt ........... F16L 37/0982
6,397,884 B1    6/2002 Miyajima et al.
9,841,132 B2 * 12/2017 Chang ..................... F16L 37/38

FOREIGN PATENT DOCUMENTS

| CN | 1182473 A | 5/1998 |
| CN | 102472211 A | 5/2012 |
| JP | 2000-320772 A | 11/2000 |
| JP | 2006-292166 A | 10/2006 |
| JP | 2009-047156 A | 3/2009 |
| JP | 2014-530789 A | 11/2014 |
| KR | 10-2009-0056148 A | 6/2009 |
| KR | 2012-0049656 A | 5/2012 |
| KR | 2013-0015673 A | 2/2013 |
| KR | 2013-0064930 A | 6/2013 |

* cited by examiner

*Primary Examiner* — Zachary T Dragicevich
(74) *Attorney, Agent, or Firm* — Mintz Levin Cohn Ferris Glovsky and Popeo, P.C.; Peter F. Corless

(57) ABSTRACT

A quick connector of a fuel transfer line is provided to implement fuel blocking function upon abnormal fastening to a fuel inflow/outflow nipple disposed in a fuel transfer line of a vehicle and prevents fuel leakage due to incomplete fastening to the fuel inflow/outflow nipple. The quick connector is fastened to a fuel inflow/outflow nipple of a fuel transfer line and includes a connector casing that has a rear end to which a fuel inflow/outflow nipple is inserted and fastened. Additionally, a bypass cylinder is inserted into a front end of the connector casing in a linearly movable manner by hydraulic pressure of fuel and forms a flow path for a selective flow of fuel depending on a location within the connector casing.

4 Claims, 3 Drawing Sheets

< At the time of normal fastening >

< At the time of defective fastening >

QUICK CONNECTOR OF FUEL TRANSFER LINE

CROSS-REFERENCE TO RELATED APPLICATION

This application claims under 35 U.S.C. § 119(a) the benefit of priority to Korean Patent Application No. 10-2015-0151727 filed on Oct. 30, 2015, the entire contents of which are incorporated herein by reference.

BACKGROUND (a) Technical Field

The present disclosure relates to a quick connector of a fuel transfer line and more specifically, to a quick connector of a fuel transfer line that prevents fuel leakage due to incomplete fastening to a fuel inflow/outflow nipple disposed in a fuel transfer line of a vehicle.

(b) Background Art

In general, when a fuel pipe arranged from a fuel tank is connected to a fuel inflow/outflow nipple, which is connected to a fuel injection system of an engine mounted within an engine compartment, along the underbody of a vehicle body to supply fuel stored in the fuel tank into a cylinder of the engine, a quick connector is used for the purpose of one-touch complete fastening (or quick locking).

Regarding conventional quick connectors, since it may be difficult to identify, through a fastening sound, whether complete fastening (normal fastening) is achieved due to ambient noise, defective fastening may occur upon inserting and assembling a fuel inflow/outflow nipple and thus, fuel leakage may occur upon starting the vehicle and thus there is a problem that vehicle fire or other accident may be caused.

The above information disclosed in this section is merely for enhancement of understanding of the background of the invention and therefore it may contain information that does not form the prior art that is already known in this country to a person of ordinary skill in the art.

SUMMARY

The present invention provides a quick connector of a fuel transfer line that may implement fuel blocking function upon abnormal fastening to a fuel inflow/outflow nipple disposed in a fuel transfer line of a vehicle and thus fundamentally may prevent fuel leakage due to incomplete fastening to the fuel inflow/outflow nipple.

Accordingly, in one aspect, the present invention provides a quick connector of a fuel transfer line, which may be fastened to a fuel inflow/outflow nipple of a fuel transfer line, that may include: a connector casing having a rear end to which a fuel inflow/outflow nipple may be inserted and fastened; and a bypass cylinder inserted into a front end of the connector casing in a linearly movable manner by hydraulic pressure of fuel, and forming a flow path for a selective flow of fuel based on its location within the connector casing.

According to an exemplary embodiment of the invention, the bypass cylinder may be formed at a central portion thereof based on a flow direction of fuel with a partition wall for blocking fuel flow, and first bypass apertures for fuel outflow and second bypass apertures for fuel inflow may be formed respectively on a front end outer peripheral surface and a rear end outer peripheral surface of the bypass cylinder based on the partition wall. As an example, the first bypass apertures may be disposed to be spaced apart from each other on the front end outer peripheral surface of the bypass cylinder along the circumferential direction and the second bypass apertures may be disposed to be spaced apart from each other on the rear end outer peripheral surface of the bypass cylinder along the circumferential direction.

In addition, the connector casing may be disposed at a front end thereof with a bypass space portion capable of connecting the first bypass apertures and the second bypass apertures at the exterior of the bypass cylinder and thus, fuel may flow therebetween and may also be formed with a flow path blocking portion adjacent to a rear end of the bypass space portion and a fuel inflow portion for fuel inflow adjacent to a front end of the bypass space portion, wherein the flow path blocking portion and the fuel inflow portion may have inner diameters that correspond to an outer diameter of the bypass cylinder.

Furthermore, according to another exemplary embodiment of the present invention, a connector body, to which a plurality of retainers for fastening the fuel inflow/outflow nipple are joined, may be installed in the rear end of the connector casing. When the fuel inflow/outflow nipple is inserted normally into and fastened to the rear end of the connector casing, the fuel inflow/outflow nipple may be configured to support the rear end of the bypass cylinder in the inside of the flow blocking portion and thus, the first and second bypass apertures may be surrounded by the bypass space portion and opened. Further, when the fuel inflow/outflow nipple is inserted abnormally into the rear end of the connector casing, at least second bypass apertures of the first and second bypass apertures may be surrounded by the flow path blocking portion and closed. The connector casing may include an O-ring to prevent fuel leakage, which may be installed at the front of the connector body to which the retainers are joined.

The quick connector of a fuel transfer line according to the present invention allows fuel flow in the fuel transfer line, which is supplied from the fuel tank to the engine side, to be blocked when fastening to the fuel inflow/outflow nipple is defective and thus, it may be possible to prevent fuel leakage due to incomplete fastening and a vehicle fire that may be caused accordingly. Furthermore, when normal fastening to the fuel inflow/outflow nipple is not accomplished, fuel transfer may be blocked by the bypass cylinder and thus, fuel supply from the fuel tank to the engine side may be interrupted and accordingly vehicle running may be prevented.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1A:
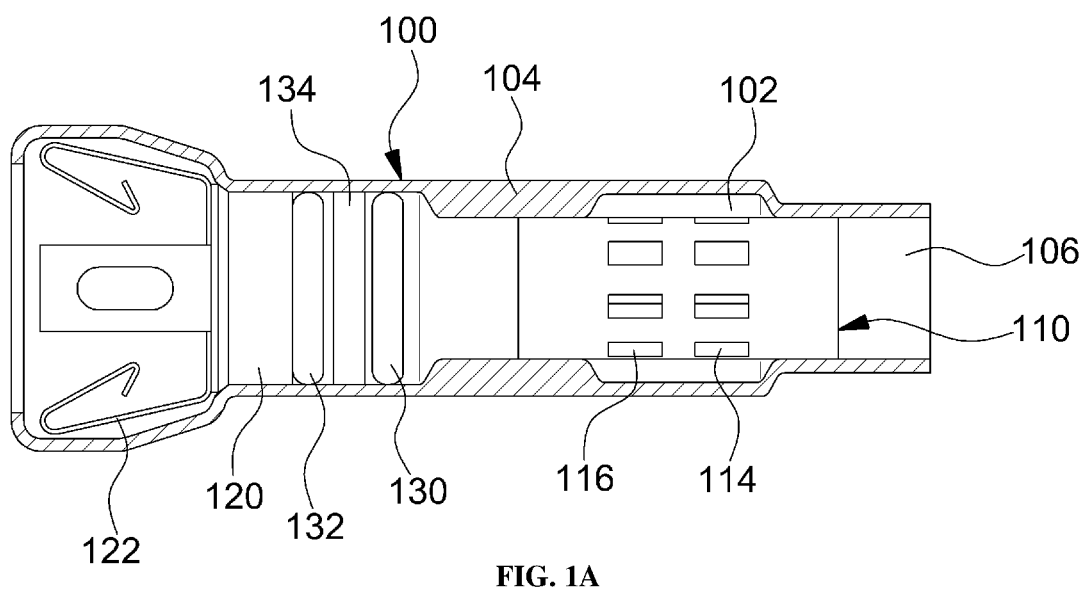
FIGS. 1A-1B are configuration diagrams illustrating a quick connector of a fuel transfer line, according to an exemplary embodiment of the invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The present invention relates to a quick connector fastened to a fuel inflow/outflow nipple disposed in a fuel transfer line of a vehicle, wherein a bypass cylinder for selectively forming a fuel bypass flow path may be inserted into and installed in the inside of a connector casing and wherein the fuel bypass flow path may be formed upon normal fastening and the fuel bypass flow path may be blocked upon defective fastening, based on pressure of fuel supplied from a front end of the connector casing and a location of the bypass cylinder, in which both front and rear ends thereof may be supported by the fuel inflow/outflow nipple inserted into a rear end of the connector casing, and thus fuel flow and transfer may be fundamentally blocked during defective fastening, to thus prevent a problem of fuel leakage.

Figure 1B:
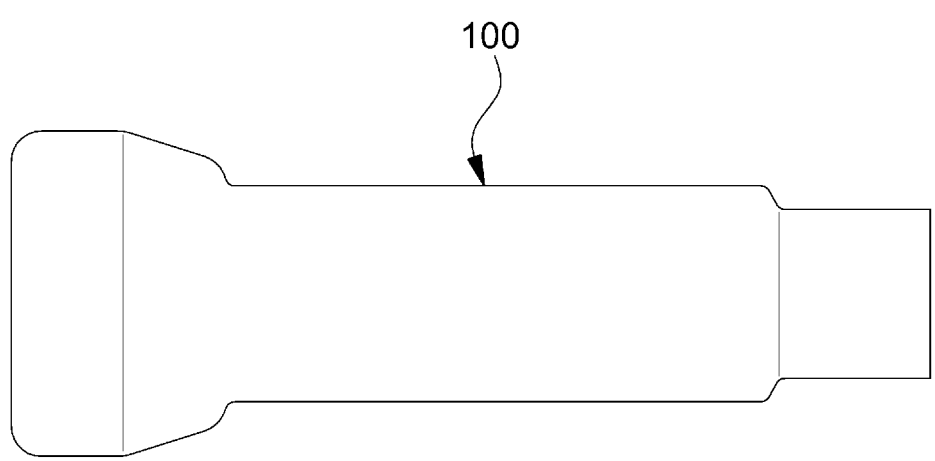

Referring to FIGS. 1A-1B, the quick connector of a fuel transfer line according to the present invention may be installed in the form that a bypass cylinder 110, a connector body 120, and O-rings 130 and 132 may be inserted into a connector casing 100. The connector casing 100 may have an interior space that extends substantially linearly, wherein the bypass cylinder 110 may be inserted into a front end of the connector casing in a longitudinal direction based on a transfer/flow direction of fuel in a linearly movable manner; a bypass space portion 102 configured to bypass fuel flow to the exterior of the bypass cylinder 110 may be formed at the front end of the connector casing; and a fuel inflow portion 106 disposed adjacent to a front end of the bypass space portion 102 and a flow path blocking portion 104 disposed adjacent to a rear end of the bypass space portion 102 may be formed.

Figure 2:
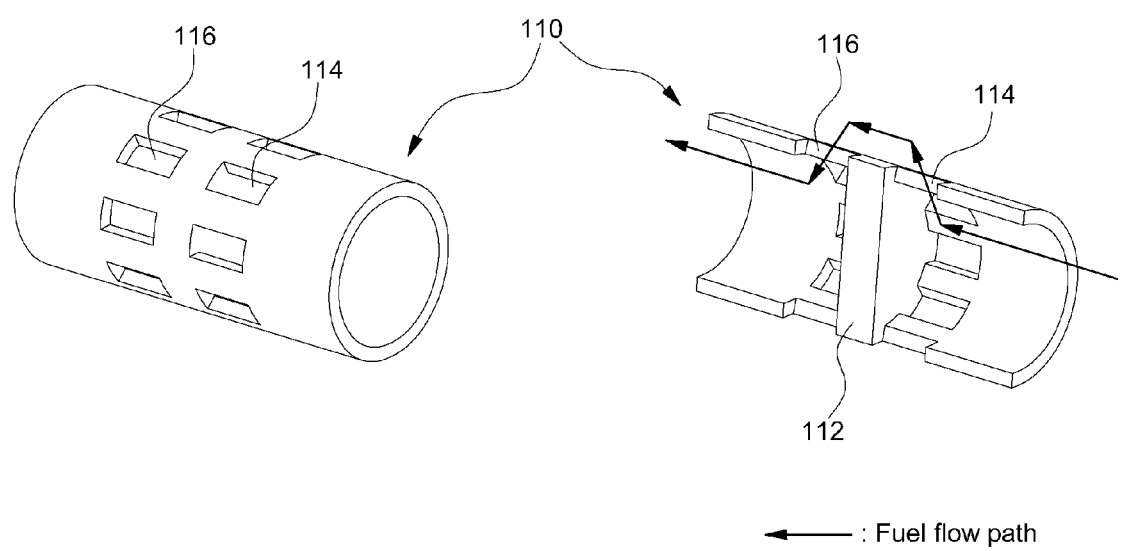
FIG. 2 is a perspective view illustrating a bypass cylinder according to an exemplary embodiment of the present invention.

Referring to FIG. 2, the bypass cylinder 110 may have a shape of a hollow pipe and may be formed integrally at a central portion thereof based on a flow direction of fuel with a partition wall 112 configured to block fuel transfer/flow. A plurality of first bypass apertures 114 for fuel outflow and a plurality of second bypass apertures 116 for fuel inflow may be formed respectively on a front end outer peripheral surface and a rear end outer peripheral surface of the bypass cylinder 110 based on the partition wall 112.

Further, the bypass cylinder 110 may be configured to move linearly within the connector casing 100 by pressure of fuel supplied from the fuel inflow portion 106 of the connector casing 100. The first and second bypass apertures 114 and 116 may be opened or closed based on a movement location of the bypass cylinder and thus, fuel flowing into the front end of the bypass cylinder 110 may be selectively transferred to the rear end of the bypass cylinder 110 via the bypass space portion 102.

In other words, a fuel bypass path (e.g., first bypass apertures 114→bypass space portion 102→second bypass apertures 116) may be formed selectively based on a location of the bypass cylinder 110 installed in the front end of the connector casing 100. The location of the bypass cylinder 110 may vary based on a fastening state of a fuel inflow/outflow nipple 200 (see, FIG. 3) configured to support the bypass cylinder 110 in the rear, as described later with reference to FIG. 3.

Additionally, the bypass cylinder 110 may have an outer diameter that corresponds to an inner diameter of the flow path blocking portion 104 adjacent to a rear end of the bypass space portion 102 and an inner diameter of the fuel inflow portion 106 adjacent to a front end of the bypass space portion 102. The first bypass apertures 114 and the second bypass apertures 116 located at both sides of the partition wall 112 (with the partition wall interposed therebetween) may be arranged to be spaced apart from each other along the circumferential direction of the bypass cylinder 110. In other words, the connector casing 100 may have an inner diameter that corresponds to an outer diameter of the bypass cylinder 110 at a front end thereof except the bypass space portion 102, and the bypass cylinder 110 may form a fuel flow path (e.g., fuel bypass flow path) for selectively flowing fuel based on a location thereof within the connector casing 100.

Moreover, the bypass space portion 102 may be configured to connect the first bypass apertures 114 and the second bypass apertures 116 to allow fuel to flow therebetween at the exterior of the bypass cylinder 110. In addition, the connector casing 100 may include a first O-ring 130 and a second O-ring 132 to prevent fuel leakage, which may be inserted into and installed at the rear end of the connector casing in a line, and a connector body 120 may be inserted into and installed fixedly to the rear side of the O-rings.

The connector casing 100 may further include a stopper 134 configured to limit the location of the first and second O-rings 130 and 132, which may be inserted and installed between the first O-ring 130 and the second O-ring 132. Thus, the first O-ring 130 may be disposed between the flow path blocking portion 104 and the stopper 134 while the second O-ring 132 is inserted and installed between the stopper 134 and the connector body 120.

The connector body 120 may include a plurality of retainers 122 configured to fasten a fuel inflow/outflow nipple 200, which may be arranged to be spaced apart from each other in the circumference direction of the connector body 120 and joined to the rear end of the connector body. When the fuel inflow/outflow nipple 200 is inserted into the rear end inside of the connector casing 100, a catching ledge 202 (see, FIG. 3) formed protrusively on the outer peripheral surface of the fuel inflow/outflow nipple 200 may be fastened to the retainer 122 with a rear end thereof being caught and supported to the retainer.

The retainer 122 may be a bent sheet metal that may be deformed and restored elastically. Particularly, when inserting the fuel inflow/outflow nipple 200, the retainer 122 may be subjected to compressive deformation and allows the catching ledge 202 to reach a location to be during normal fastening. Simultaneously, when the catching ledge 202 reaches the location to be during normal fastening, the retainer 122 may be configured to restore and allow the catching ledge 202 to be caught thereto, to prevent the displacement of the fuel inflow/outflow nipple 200 and maintain fastening state.

Figure 3A:
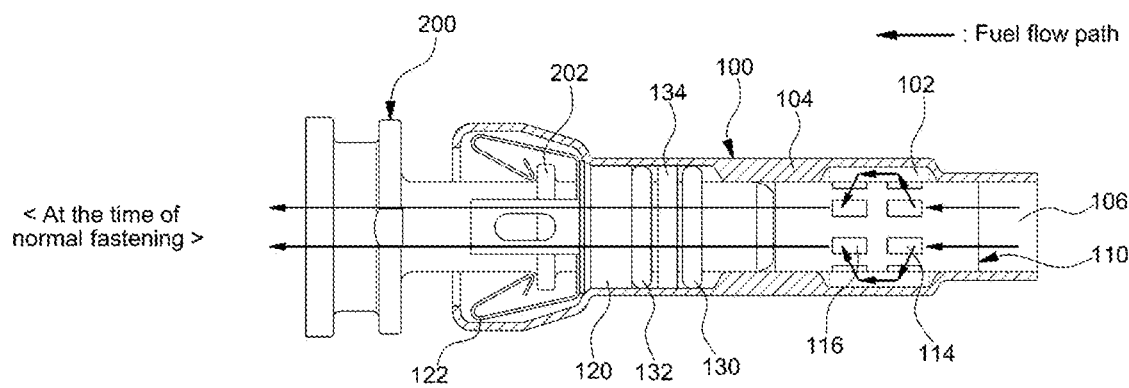
FIG. 3A is a diagram showing working modes during normal fastening of a quick connector according to an exemplary embodiment of the present invention.
Figure 3B:
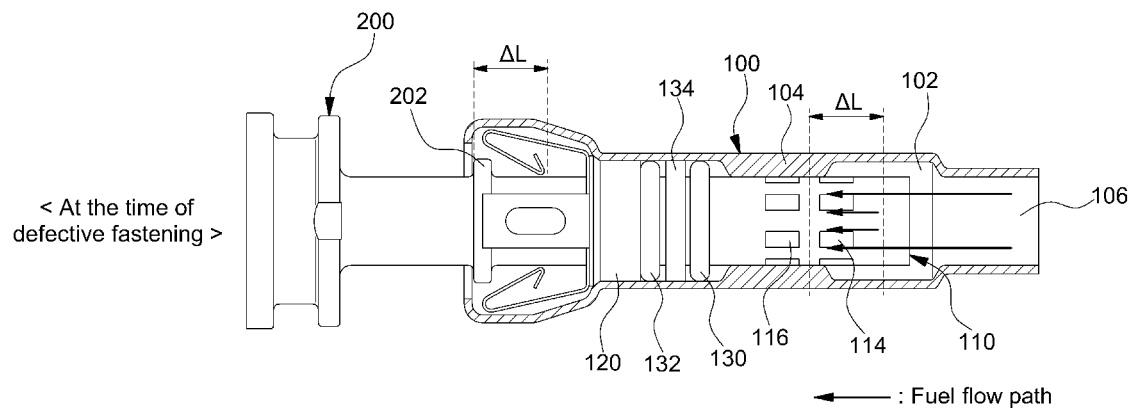
FIG. 3B is a diagram showing working modes during defective fastening of a quick connector according to an exemplary embodiment of the present invention, respectively.

Herein below, FIGS. 3A-3B will be described regarding a working mode of a quick connector fastening to a fuel inflow/outflow nipple disposed in a fuel transfer line of a vehicle. Referring to FIGS. 3A-3B, when the fuel inflow/outflow nipple 200 is inserted normally into and fastened to the rear end of the connector casing 100, the catching ledge 202 of the fuel inflow/outflow nipple 200 may be caught to the retainer 122 and a rear end thereof may be supported thereto, and a tip of the front end of the nipple 200 may be configured to support the rear end of the bypass cylinder 110 in the inside of the flow path blocking portion 104.

Furthermore, the tip of the front end of the nipple 200 may be in contact with the flow path blocking portion 104 since the front end of the nipple has an outer diameter that corresponds to the inner diameter of the flow path blocking portion 104. Under such normal fastening state, once hydraulic pressure of fuel is supplied into the inside of the connector casing 100 through the fuel inflow portion 106, the bypass cylinder 110 may be located at the front end of the connector casing 100 with a rear end thereof supported by the fuel inflow/outflow nipple 200 and both ends thereof may be fitted air tightly into the flow path blocking portion 104 and the fuel inflow portion 106.

Additionally, the bypass cylinder 110 may be located with the first and second bypass apertures 114 and 116 surrounded by the bypass space portion 102, and fuel flowing into the front end of the bypass cylinder 110 through the fuel inflow portion 106 may be discharged from the front end of the bypass cylinder 110 through the first bypass apertures 114 and then the fuel may flow into the rear end of the bypass cylinder 110 through the second bypass apertures 116 and, at this time, the fuel may flow into the rear end of the bypass cylinder 110 via the bypass space portion 102. In other words, during normal fastening, a fuel bypass flow path formed as a route in the order of first bypass apertures 114→bypass space portion 102→second bypass apertures 116 may be opened and thus, fuel flowing into the connector casing 100 may pass through the bypass cylinder 110 and then fuel passing through the bypass cylinder 110 may be transferred to and flow in the fuel inflow/outflow nipple 200.

Meanwhile, when the fuel inflow/outflow nipple 200 is inserted abnormally (e.g., an incomplete insertion) into and incompletely fastened to the rear end of the connector casing 100, since the fuel inflow/outflow nipple 200 is inserted incompletely compared to the state of normal fastening, the catching ledge 202 of the fuel inflow/outflow nipple 200 may not be supported by the retainer 122 at a rear end thereof and the tip of the front end of the nipple 200 may not reach the flow path blocking portion 104.

Under such defective fastening state, once hydraulic pressure of fuel is supplied to the connector casing 100 through the fuel inflow portion 106, the bypass cylinder 110 may be pushed to move rearward by the hydraulic pressure of fuel, and at least second bypass apertures 116 of the first and second bypass apertures 114 and 116 may be covered (or surrounded) by the flow path blocking portion 104 and then closed, and thus, the fuel bypass flow path formed as a route in the order of first bypass apertures 114→bypass space portion 102→second bypass apertures 116 may be blocked.

Accordingly, fuel flowing into the front end of the bypass cylinder 110 may be blocked by the partition wall 112 and thus incapable of being transferred to the rear end of the bypass cylinder 110 and eventually fuel transfer to the fuel inflow/outflow nipple 200 may be blocked, and thus, fuel leakage caused upon defective fastening may be prevented. With the quick connector according to the present invention, it may be possible to fundamentally prevent fuel leakage due defective fastening, owing to the fact that upon abnormal fastening to the fuel inflow/outflow nipple 200, at least second bypass apertures 116 may be blocked based on a location of the bypass cylinder 110 within the connector casing 100 and thus fuel transfer may be blocked. As an example, such quick connector may be disposed at the end portion of a fuel transfer line such as a fuel supply pipe configured to supply fuel to an engine, a fuel return pipe configured to return fuel that has not consumed in an engine to a fuel tank, and the like, and may be fastened to a fuel inflow/outflow nipple of a fuel tank or a fuel inflow/outflow nipple for a fuel pump.

The invention has been described in detail with reference to exemplary embodiments thereof. However, it will be appreciated by those skilled in the art that the scope of the present invention is not limited to the exemplary embodiments as mentioned above and that changes may be made in these exemplary embodiments without departing from the principles and spirit of the invention, the scope of which is defined in the appended claims and their equivalents.

What is claimed is:

1. A quick connector of a fuel transfer line, comprising:
    a connector casing having a rear end to which a fuel inflow/outflow nipple of the fuel transfer line is inserted and fastened; and
    a bypass cylinder inserted into a front end of the connector casing in a linearly movable manner by hydraulic pressure of fuel, and forming a flow path for a selective flow of fuel based on a location within the connector casing, wherein the bypass cylinder is formed at a central portion thereof based on a flow direction of fuel with a partition wall configured to block fuel flow into the bypass cylinder, and first bypass apertures for fuel outflow from inside of a front end of the bypass cylinder and second bypass apertures for fuel inflow to inside of a rear end of the bypass cylinder are formed respectively on a front end outer peripheral surface and a rear end outer peripheral surface of the bypass cylinder based on the partition wall, wherein the connector casing is disposed at a front end thereof with a bypass space portion that connects the first bypass apertures and the second bypass apertures at the exterior of the bypass cylinder to allow fuel to flow therebetween, wherein the connector casing is formed with a flow path blocking portion disposed adjacent to a rear end of the bypass space portion, and the flow path blocking portion has an inner diameter that corresponds to an outer diameter of the bypass cylinder, wherein a connector body, to which a plurality of retainers for fastening the fuel inflow/outflow nipple are joined, is installed in the rear end of the connector casing, and when the fuel inflow/outflow nipple is inserted normally into the rear end of the connector casing, a catching ledge formed protrusively on the outer peripheral surface of the fuel inflow/outflow nipple is caught and fastened to the retainer, the first and second bypass apertures are surrounded by the bypass space portion and opened, wherein when the fuel inflow/outflow nipple is inserted abnormally into the rear end of the connector casing, the catching ledge is not caught and fastened to the retainer, at least second bypass apertures of the first and second bypass apertures are surrounded by the flow path blocking portion and closed, and wherein the catching ledge is not caught and fastened to the retainer until the first and second bypass apertures are surrounded by the bypass space portion and opened.

2. The quick connector of claim 1, wherein the connector casing includes a fuel inflow portion for fuel inflow adjacent to a front end of the bypass space portion, and the fuel inflow portion has an inner diameter that corresponds to an outer diameter of the bypass cylinder.

3. The quick connector of claim 1, wherein the first bypass apertures are arranged to be spaced apart from each other on the front end outer peripheral surface of the bypass cylinder along a circumferential direction and the second bypass apertures are arranged to be spaced apart from each other on the rear end outer peripheral surface of the bypass cylinder along the circumferential direction.

4. The quick connector of claim 1, wherein the connector casing includes an O-ring configured to prevent fuel leakage and the O-ring is installed at the front of the connector body.

* * * * *